No. 12,219. REISSUED MAY 17, 1904.

R. E. FOSTER.

RUBBER TREAD.

APPLICATION FILED APR. 14, 1904.

Witnesses:
John F. C. Printkert
Darwin D. Dorsey

Inventor:
Rufus E. Foster
by his Attorneys
Phillips Van Emburgh & Fish

No. 12,219. Reissued May 17, 1904.

UNITED STATES PATENT OFFICE.

ROLON E. FOSTER, OF EAST BOSTON, MASSACHUSETTS, ASSIGNOR, BY MESNE ASSIGNMENTS, TO THE FOSTER RUBBER COMPANY, OF KENNEBUNK, MAINE, A CORPORATION OF MAINE.

RUBBER TREAD.

SPECIFICATION forming part of Reissued Letters Patent No. 12,219, dated May 17, 1904.

Original No. 695,298, dated March 11, 1902. Application for reissue filed April 14, 1904. Serial No. 198,171.

*To all whom it may concern:*

Be it known that I, ROLON E. FOSTER, a citizen of the United States, residing at East Boston, in the county of Suffolk and State of Massachusetts, have invented certain new and useful Improvements in Rubber Treads; and I do hereby declare the following to be a full, clear, and exact description of the invention, such as will enable others skilled in the art to which it appertains to make and use the same.

The present invention relates to an improvement in rubber treads for soles or heels for boots and shoes or other articles.

The object of my invention is to produce an improved rubber tread for soles or heels for boots or shoes or other articles provided with plugs of textile threads or strands which are firmly secured in the body of the tread and exposed to the tread-surface in order to make a tread which will not slip on wet pavements and which at the same time will be more durable than rubber alone.

To the above end the present invention consists in the tread for rubber soles or heels or other articles, hereinafter described and claimed.

Figure 1:
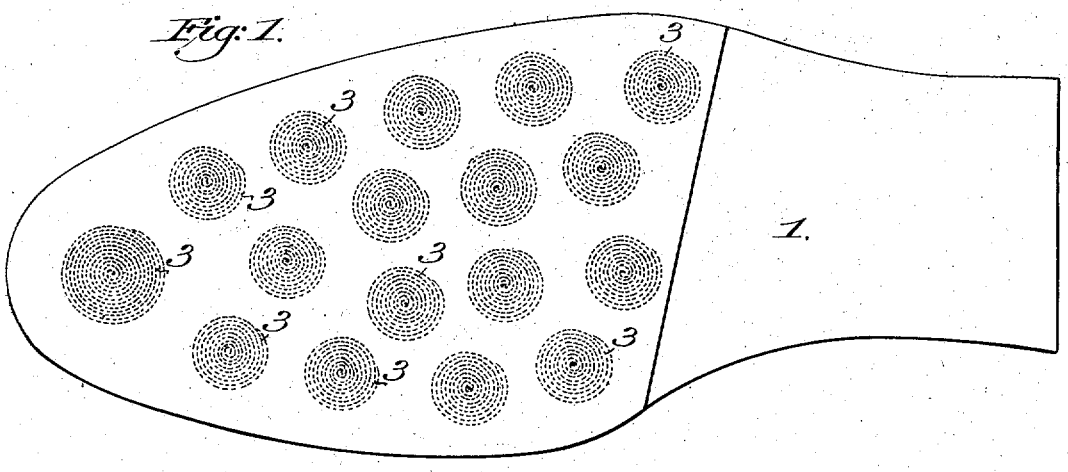
Figure 2:
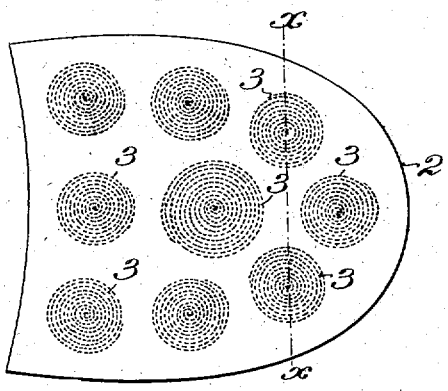
Figure 3:
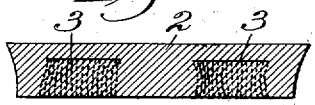
Figure 4:
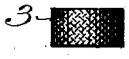

In the accompanying drawings, illustrating the preferred form of my invention as embodied in a tread for boots or shoes, Figure 1 is a plan of a sole. Fig. 2 is a plan of a heel. Fig. 3 is a section of the heel on the line *x x*, Fig. 2, illustrating my invention; and Fig. 4 is a side elevation of one of the plugs hereinafter referred to.

According to my invention I incorporate in a body of rubber a plug of rubber provided with threads or strands of textile material incorporated therewith. In order that the threads or strands may be exposed to the tread-surface of the tread and resist the wear and prevent slipping thereof, I prefer to incorporate the threads or strands of textile material in the form of cloth impregnated with and vulcanized into the rubber of the tread. The cloth will be incorporated into the rubber of the tread, so that the warp and weft threads approach the tread-surface of the tread on diagonal lines, whereby the ends of the warp and weft threads will be exposed to the tread-surface of the tread. (See Fig. 4.) This is conveniently accomplished by winding pieces of cloth on a line diagonal to the warp and weft, which cloth is impregnated with rubber and then incorporated in the body of the tread in any convenient way.

In the drawings a sole 1 and heel 2 are shown as provided with plugs 3 of wound cloth and rubber, which are vulcanized into the body of the sole. It is not material to my invention what method is employed to vulcanize the plugs into the sole. The plugs may be made by rolling up a piece of cloth impregnated with rubber into a roll of the size of the plug to be used. Then this roll will be cut into lengths appropriate for the thickness of the sole or heel to be made. (See Fig. 4.) The plugs may be set up in the mold and the rubber compound laid thereon and then the whole subjected to pressure and heat in the usual manner of vulcanizing rubber, with the result that the rubber compound will flow around and embrace the plugs, whereby the plugs and the rubber compound will be vulcanized into one mass. I prefer, however, in order to prevent the accidental displacement of the plugs sometimes incident to the method above suggested to cut out the rubber compound in approximately the shape of the tread to be formed and to punch holes in it corresponding in shape and position to the plugs which are to occupy them and then to insert the plugs in the holes thus formed. The blank thus formed is then vulcanized in the usual manner.

While it is within the scope of my invention to employ plugs of textile material and rubber which extend from surface to surface of the tread, my invention is preferably embodied in a tread in which the plugs extend from the tread-surface partially through the tread, leaving the portion of the tread unpenetrated by the plugs of unimpaired elasticity, as shown in Fig. 3. This construction has all the virtues of an elastic top lift, with the added advantages of the frictional qualities of a tread-surface provided with threads or strands of textile material. If desired, the plugs may project beyond the tread-surface of a sole or heel to form knobs or projections to insure a firmer footing on soft ground, as in golf or outing shoes. Furthermore, for reasons apparent to those skilled in the art I prefer to surround each plug by a portion of rubber which is more highly elastic than the body of the tread, thereby forming a durable and elastic union between the body of the tread and the less elastic plug, and so far as this feature of my invention is concerned it is immaterial whether the cloth of the plug be wound on a diagonal or not.

Soles or heels for boots or shoes may be secured to the sole or heel of the shoe in any desired manner, as by nails or cement or sewing.

Treads in which the plugs of rubber and textile material do not extend entirely through the tread may be made in any desired way. A convenient method of making such treads consists in dying out two pieces of unvulcanized rubber compound of the shape of the desired article, the one of a thickness equal to the portion of the tread through which the plugs extend and the other of a thickness equal to the unpenetrated portion of the tread. Holes for the plugs are then cut in the first piece of rubber compound, and the plugs are inserted therein. This is then laid in the mold. The other piece of rubber compound is laid thereon and the mold is subjected to pressure and heat, thereby vulcanizing the whole into one solid article. It is to be understood, however, that the methods of manufacturing the improved article of manufacture defined by the claims form no part of my invention, as any desired method of manufacture may be employed that may be found suitable or convenient, the methods described herein being merely described in order to point out methods which I have practiced and which are the best now known to me.

While I have illustrated my invention as employing cylindrical plugs of textile material, it is to be understood that it is not specifically limited to any particular form or shape of plug, as it may be made of any suitable or desired shape or configuration, or it may be made of layers of cloth and rubber cut up to form the plugs. In any event the plugs and the tread are so intimately and securely united together that the shape of the plug is immaterial. It is to be noted also that in its broader aspects my improved tread might be made almost entirely of transverse slices of cloth and rubber, with a surrounding support of rubber. My invention is by no means limited to the specific form of tread shown, as the same may be embodied in various forms and used for various purposes without departing from the spirit of my invention. It is within the purview of my invention to make a sole and heel in one piece. My invention contemplates, broadly, a rubber tread provided with threads or strands of textile material vulcanized into it, extending diagonally toward and having ends exposed on the tread-surface thereof provided with a surrounding body of rubber.

Having thus described my invention, I claim as new and desire to secure by Letters Patent of the United States of America—

1. A rubber tread, having a plug formed of layers of textile material and rubber, the threads or strands of the textile material extending diagonally to the tread-surface of the tread, and a body portion of rubber surrounding and supporting the plug, the whole being vulcanized into an integral tread, substantially as described.

2. A rubber tread, consisting of a body portion of rubber provided with a plug of rubber and textile material, the plug and body portion being united by a layer of rubber more highly elastic than the body portion of the tread, the whole being vulcanized into one mass, substantially as described.

In testimony whereof I affix my signature in presence of two witnesses.

ROLON E. FOSTER.

Witnesses:
D. S. PRATT,
ALFRED H. HILDRETH.